N. Ames,
Bottle Stopper.
N° 34,227.   Patented Jan. 21, 1862.

Witnesses
Samuel Green
A. C. Marlin

Inventor
Nathan Ames.

UNITED STATES PATENT OFFICE.

NATHAN AMES, OF SAUGUS CENTRE, ASSIGNOR TO THE GOODYEAR INDIA RUBBER STOPPLE COMPANY, OF BOSTON, MASSACHUSETTS.

IMPROVED BOTTLE-STOPPLE.

Specification forming part of Letters Patent No. 34,227, dated January 21, 1862.

*To all whom it may concern:*

Be it known that I, NATHAN AMES, of Saugus Centre, in the county of Essex and Commonwealth of Massachusetts, have invented a new and useful Stopple for Bottles; and I do hereby declare that the following is a full, clear, and exact description of the construction and operation of the same, reference being had to the accompanying drawings, forming a part of this specification, in which—

Figure 1:
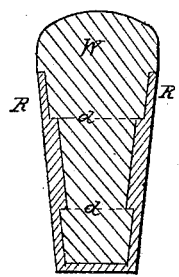
Figure 2:
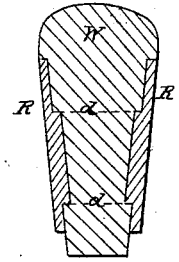
Figure 3:
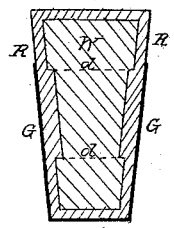

Figure 1 is a longitudinal section of a stopple consisting of a rubber thimble and a wooden core; Fig. 2, a similar core encircled by a ring or band of rubber; and Fig. 3 is a core of wood (or other material cheaper than rubber) entirely covered by a rubber case, R, and partially covered with a thin coating of gutta-percha, G.

Like parts are indicated by the same letters in all the drawings.

To enable others skilled in the art to make and use my invention, I will now proceed to describe its construction and operation.

W, Figs. 1 and 2, is a core or plug of wood, metal, or other rigid material, shaped substantially as shown in the drawings, with an annular depression, $d$, (between the dotted lines,) for the purpose of confining the rubber and also allowing the same to be of greater thickness where the most elasticity is required. This core may be inserted in a rubber thimble, as represented in Fig. 1, or encircled by a ring or band of rubber, as represented in Fig. 2; or (the rounded top being cut off) the core may be entirely covered by a rubber case, as shown in Fig. 3. Where, however, the rubber entirely covers the core, as in Fig. 3, cork, ground cork, sawdust, cotton, woolen, leather, or any earthy matter may be used as a substitute for the wooden core. The rubber used may be pure or mixed, and either vulcanized or not. As there are, however, many liquids which dissolve or destroy india-rubber, but have no injurious effect on gutta-percha, I apply in some instances a thin coating, G, of the latter material to that portion of the stopple which may be exposed to the action of such liquids, as represented in Fig. 3, the rubber affording the requisite amount of elasticity and the core W the desired degree of strength and cheapness. It is obvious, however, that the gutta-percha can be applied equally well to stopples constructed as represented in Figs. 1 and 2. Thus my method of constructing stopples not only effects a saving of from thirty to fifty per cent., or more, in the rubber, but the core W affords (what is wanting in stopples composed entirely of rubber) that degree of rigidity and strength required in forcing or screwing the stopple into the neck of a bottle, thus making a better as well as a cheaper article than one composed entirely of rubber.

Stopples of this description are also very useful as "gun-corks" and tampions. They are, moreover, (especially when constructed as shown in Fig. 2,) exceedingly well adapted for stopping bung-holes, milk-cans, jars, &c., being cheaper even than cork, and much more durable and efficient.

What I claim as my invention, and desire to secure by Letters Patent, is—

1. As a new article of manufacture, a stopple consisting of a band, case, or thimble, R, of rubber or any of its compounds, and a core, W, of wood or other material, substantially as described, and for the objects specified.

2. Constructing the core W with an annular depression, $d$, for the purpose of confining the rubber and allowing the same to be of greater thickness where the most elasticity is required.

3. Constructing a stopple with a core, W, rubber band, case, or thimble R, and a thin coating of gutta-percha, G, substantially as described, and for the objects specified.

NATHAN AMES.

Witnesses:
SAMUEL GREEN,
A. C. MARTIN.